United States Patent [19]
Adams

[11] 3,744,595
[45] July 10, 1973

[54] VEHICLE DRUM BRAKES
[75] Inventor: William John Pearce Adams, Tyseley, England
[73] Assignee: Girling Limited, Birmingham, England
[22] Filed: Aug. 12, 1971
[21] Appl. No.: 171,135

[30] Foreign Application Priority Data
Aug. 14, 1970  Great Britain.................. 39,378/70
Nov. 9, 1970  Great Britain.................. 53,105/70

[52] U.S. Cl. ........ 188/79.5 P, 188/196 D, 188/217, 188/331
[51] Int. Cl............................................ F16d 65/56
[58] Field of Search.................. 188/79.5 P, 79.5 S, 188/79.5 SC, 196 M, 196 D, 217, 331

[56] References Cited
UNITED STATES PATENTS
2,102,851  12/1937  La Brie.............................. 188/331
2,157,994  5/1939  Baisch.......................... 188/79.5 SC
2,168,700  8/1939  Burnett.............................. 188/331
2,918,146  12/1959  Cronillaud............... 188/79.5 SC X Primary Examiner—Duane A. Reger
Attorney—Scrivener, Parker, Scrivener & Clarke

[57] ABSTRACT
An abutment assembly for interconnecting the ends of two brake shoes of a vehicle drum brake, the other ends of the shoes being connected to actuating means, comprising an elastically deformable member confined between piston-like portions of two tappets coupled to the respective shoes, these pistons having different areas of engagement with the elastic member so that only a part of the thrust applied to the assembly by one brake shoe is transmitted to the other shoe. The invention provides improved shaping of the elastic member; sealing means between the elastic member and the pistons; means for adjusting the length of the tappets to compensate for wear; and means for effecting such adjustment automatically.

7 Claims, 7 Drawing Figures

VEHICLE DRUM BRAKES

The invention relates to internal shoe vehicle drum brakes of the two leading shoe type.

The object of the two leading shoe brakes is to apply each brake shoe to the drum so as to exert a substantially constant pressure over the entire length of the brake lining.

The abutment load on the trailing edge of the leading shoe proper cannot be used directly to actuate the other shoe, as the servo-effect created by the rotation of the wheel would result in the second shoe being applied with greater pressure than the first.

In the past the desired effect has been obtained either by actuating each shoe by separate means and suitably angling the respective abutments, or by a system of bell cranks and levers interconnecting the two shoes at their non-actuated ends. The present invention makes use of another means of interconnecting the non-actuated ends of the two shoes, namely an abutment assembly comprising a pair of opposed tappets for engagement with the respective brake shoes, and an elastically deformable member confined between piston-like portions of the tappets for transmitting thrust from one to the other, the said piston-like portions of the tappets having different areas of engagement with the deformable member so that only a part of the thrust applied to one tappet is transmitted to the other.

In accordance with one feature of the present invention the elastically deformable member of an abutment assembly of the kind referred to is so shaped that over a part of its length it is of uniform cross section and over another part of its length it is of progressively decreasing cross section, this shaping of the elastically deformable member permitting better flow of the elastomeric material under pressure, with a resultant increase in reliability and longer life.

In accordance with another feature of the invention there are provided between the end surfaces of the elastically deformable member and the tappet members which engage those surfaces, sealing means arranged to prevent the entry of the elastomeric material into the clearance gaps between the piston-like portions of the tappets and the cylinders in which they work.

Other features of the invention will sufficiently appear from the following description of particular embodiments of the invention and from the appended claims when read in the light of that description.

A number of different embodiments of the invention are shown by way of example in the accompanying drawings, in which.

Figure 1:
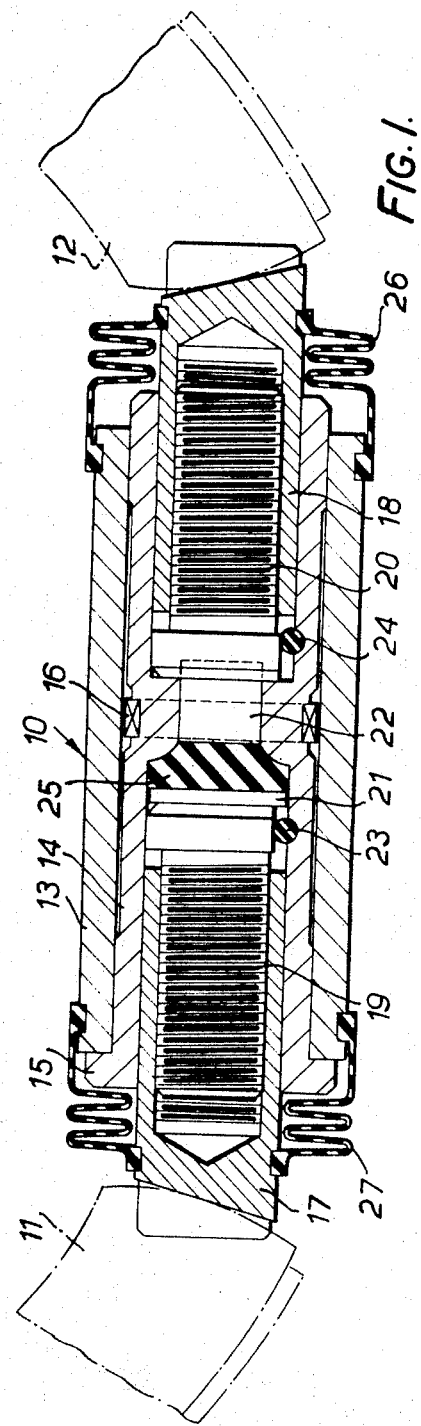
FIG. 1 is a longitudinal section through a first form of abutment assembly in accordance with the invention, shown in position between the two shoes of a drum brake, the section being taken perpendicular to the axis of the drum.

Referring first to FIG. 1, an abutment assembly 10 is shown positioned between two adjacent ends of two brake shoes 11 and 12 of a vehicle wheel drum brake. A double ended hydraulic actuator (not shown) is positioned between the other two ends of the brake shoes in accordance with normal practice.

The abutment assembly 10 shown in FIG. 1 consists of a housing 13 firmly bolted to the brake back plate (not shown) and having a cylindrical bore in which is housed a cylindrical body member 14 having a flanged end portion 15 which abuts one end of the housing 13. The body member 14 is provided with teeth 16 around a reduced diameter portion intermediate its ends. The body member 14 has axially aligned bores of varying diameter, the central portion of the bore being of smaller diameter than the two end portions. The left hand end portion of the bore houses a tappet assembly which comprises an abutment member 17, formed with an internally threaded blind bore, a plunger member 19 in the form of a headed bolt threadly connected to member 17 and a piston 21 disposed adjacent the head of plunger 19 and fitting closely in the bore of the body 14. A flat is formed on the periphery of the head of member 19 to provide a location face and this flat is engaged by a pin 23 mounted in the body member 14 and extending across the bore therein. Similarly, the right hand portion of the bore in the body member houses a tappet assembly comprising an abutment member 18 which is formed with an internally threaded blind bore, a plunger member 20 in the form of a headed bolt threadedly connected to the member 18 and a piston 22 which makes a close fit in the smaller diameter central portion of the bore in the body member. A flat is formed on the periphery of member 20 to provide a location face and this flat is engaged by a pin 24 mounted in the body member.

It will be seen that pistons 21 and 22 define with the body member 14 a chamber one end portion of which (at the left in the drawing) is of uniform diameter, while its other end is of smaller diameter, the reduction in cross section being effected progressively can continuously and not by a single abrupt step. This chamber is completely filled by a correspondingly shaped member 25 of elastically deformable material such as soft rubber.

The outer ends of the abutment members 17 and 18 are bifurcated to provide central, angled abutment surfaces for the respective brake shoes 11 and 12. The assembly is sealed against ingress of foreign matter by protective boots 26 and 27, each boot being sealingly mounted at one end on the housing 13 and at the other end on its respective abutment member 18 and 17. The provision of the teeth 16 in co-operation with a hole in the housing 13 enables the cylindrical body member 14 and the two plunger members 19 and 20 to be rotated relative to the abutment members 17 and 18 to effect adjustment of the overall length of the two tappet assemblies, and thus of the retracted position of the brake shoes, as wear takes place.

While braking during forward rotation of the wheel the upper end of the brake shoe 11 is forced into contact with the drum by the actuating device. This force is magnified by the force transmitted to the brake shoe 11 by the rotation of the wheel and is exerted on the abutment member 17 and through the plunger member 19, piston 21, deformable member 25, piston 22, plunger 20 and abutment member 18 to the other shoe 12 to apply the leading edge of that shoe to the drum. The body member 14 being prevented from sliding through the housing 13 by its flanged portion 15, the force transmitted through the abutment assembly and applied to the shoe 12 is greatly reduced by the deformable member 25 which is engaged by different end areas of the two pistons and distributes some of the force to the body member 14 and thence to the brake back plate. In reverse braking the full force from the brake shoe 12 is transmitted through the body member 14, which is free to move in that direction, to the shoe 11.

Figure 2:
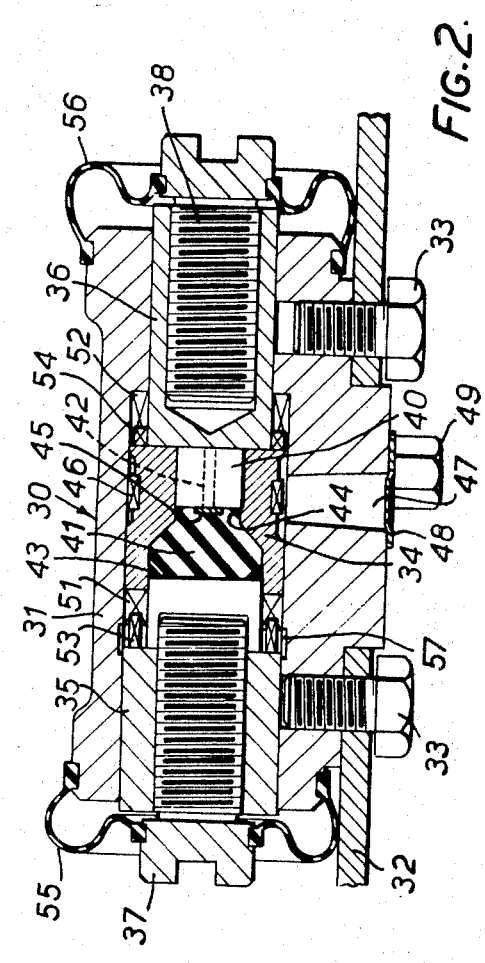
FIG. 2 is a longitudinal section through a second form of abutment assembly, the section being parallel to the axis of the brake drum.

The modified abutment assembly 30 shown in FIG. 2 consists of a housing 31 mounted on a brake back plate 32 by means of bolts 33. The housing is provided with two axially aligned bores of different diameters, in each of which a tappet assembly is slidably disposed. Each tappet assembly comprises a plunger member 35 or 36 sliding in the housing, an abutment member 37 or 38 which is threaded into the bore and has its outer end shaped to engage the corresponding brake shoe (not shown), and a piston member 39 and 40 abutting the inner end of the plunger member. The larger bore in the housing 31 also accommodates a body member 34, having a large bore at one end tapering into a smaller bore at the other end. The piston 39 is shaped so as to fit closely into the larger bore in the body and the piston 40 is shaped to fit closely into the smaller bore in the body.

Within the body member 34, between the ends of the two plunger members is an elastically deformable member 41. Against the inner faces of peripheries of the pistons 39 and 40 there are located substantially rigid nylon rings 43 and 44. As a result of manufacturing tolerances there are inevitably small gaps between the pistons 39, 40 and the bores in which they work. In the absence of sealing devices such as the rings 43 and 44 there is a risk that the elastically deformable member will be forced or "extruded" into these gaps, causing the rubber gradually to disintegrate and the assembly to jam. The hydrostatic pressure produced in operation in the elastically deformable member 41 forces the rings 43, 44 into tight sealing engagement with the adjacent end faces of the pistons 39, 40 and with the internal surface of the housing so as to prevent the elastically deformable member being forced into these edge gaps.

Through the center of the piston 40 is a small axial bore 42 to allow any air which may be trapped in the space between the ends of the two pistons 39,40 to escape. A metal disc 45 covers the end of the bore to prevent the elastically deformable member 41 entering the bore 42.

The body member 34 is formed on its outer surface with gear teeth 46 to which access can be gained through a hole 47 in the housing. A cover plate 48 normally covers this hole, but is moved away on rotation of a headed bolt 49 so that the gear teeth 46 with the whole body member 34 may be rotated by a screw driver. Both ends of the body member 34 are formed with gear teeth 57 and 52 extending in an axial direction. These gear teeth mesh respectively with gear teeth 53 and 54 on the plungers 35 and 36 respectively. Thus rotation of the body member causes rotation of the plunger members 35 and 36 with respect to the abutment members 37 and 38 which are restrained from rotating by their engagement with the brake shoes, so that adjustment of the length of each tappet assembly is effected. Boots 55 and 56 prevent ingress of dirt to the assembly.

It will be appreciated that with adjustable tappet assemblies of the construction shown in FIG. 2, comprising a bolt-like abutment member engaged in a sleeve-like plunger member, adjustment of the overall length of the assembly by relative rotation of the two component members does not reduce the length over which the assembly is supported in the housing. This arrangement minimized the risk of the assembly tilting and becoming jammed in the bore of the housing. However, by way of precaution the bore of the housing is relieved, as shown at 57 in the vicinity of the inner end of plunger member 35, to ensure that the edge of the plunger will not dig into the wall of the housing.

The abutment assembly works in a similar way to that of FIG. 1. When the brakes are applied on forward rotation, thrust from the brake shoe on the left hand side of the assembly is transmitted through the abutment member 37, plunger member 35, piston 39 elastically deformable member 41 (where part of the thrust is lost against the sides of the tapered portion of the bore of the body member 34, which cannot move to the right), piston 40, plunger 36, abutment member 38, and finally to the brake shoe on the right hand side of the assembly. On brake application while reversing the plunger 36 abuts directly against the body member 34 so that the right hand tappet assembly and the body member move together as a solid strut. Thus, thrust from the right hand shoe is applied to elastically deformable member over the tapered portion as well as over its small end portion. In this way substantially all the thrust is transmitted through the elastically deformable member 41 to the piston 39 and thence to the abutment member 37 and the left hand shoe.

Figure 3:
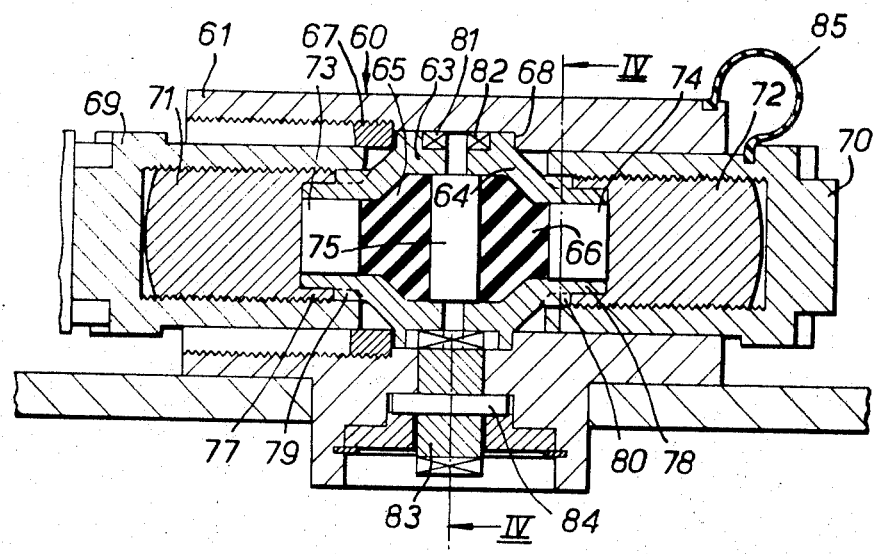
FIG. 3 is a longitudinal section, parallel to the axis of the brake drum, through a third form of abutment assembly.
Figure 4:
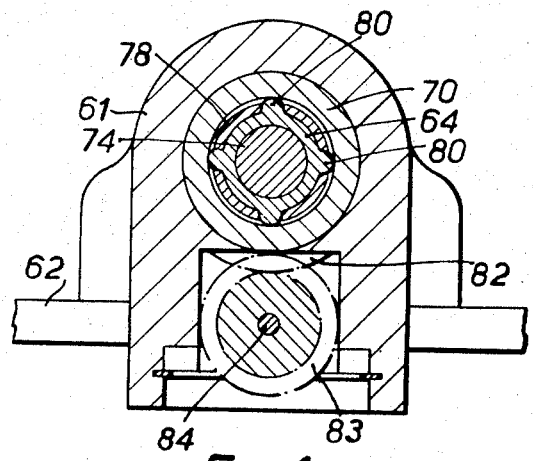
FIG. 4 is a cross section on the line IV—IV of FIG. 3.

The abutment assembly 60 shown in FIGS. 3 and 4 is so constructed that a reduction in the force transmitted from one shoe to the other during braking is reduced for both directions of drum rotation. The assembly comprises a housing 61 secured to the brake back plate 62 and formed with axially extending bores which accommodate two similar and oppositely arranged body members 63,64 each of which is formed with bore accommodating an elastically deformable member 65,66, the bore and the deformable member which fits closely within it each comprising end portions of uniform cross section, one larger than the other, and an intermediate portion which progressively decreases in cross section from the larger end portion to the smaller end portion. The two body members are supported within the housing for axial sliding movement relative thereto but the periphery of each body member abuts an axially directed face on the housing (these faces being formed respectively by a step 68 in the housing bore and by a nut 67 threaded into that bore) so that each body member is prevented from moving in the direction of tape of the intermediate portion of its bore, that is in a direction away from the other body member.

The housing bore further accommodates two similar and oppositely arranged tappet assemblies, each comprising an abutment member 69 and 70, whose outer end is shaped to make abutting engagement with the respective brake shoe a plunger member 71 and 72 in screw threaded engagement with the abutment member, (the screwthreads of the two assemblies being of opposite hands) and a piston member 73 and 74. The inner end of each plunger member abuts the outer end of the corresponding body member and also the outer end of the corresponding piston member, the latter making a close fit in the smaller diameter end portion of the bore in that body member and engaging the deformable member 65 or 66 therein. A single larger diameter piston 75 has its opposite ends fitted into the larger diameter end portions of the bores in the two body members and engaged with the elastically deformable members.

It will be appreciated that when a load is applied to one of the abutment members (say to member 69) by the corresponding brake shoe, the load will be transmitted to the plunger member 71 of that tappet assembly, thence through both the piston 73 and the body member 63 to the deformable member 65, and thence to the piston 75, all these parts moving together. Piston 75 compresses the elastic member 66 housed in the other body member 64, which is prevented from moving to the right by its engagement with the housing, and a part only of the force is transmitted to the other tappet assembly 74, 72, 70 and thence to the other brake shoe. The assembly being symmetrical in arrangement, it will be clear without further explanation that the application of a load to the other abutment member 70 will result in a reduced force being applied to the tappet assembly 73, 71 69 and the brake shoe to which it is connected.

The inner end of each plunger member 71,72 is formed with an annular extension 77, 78 which surrounds the outer end of the adjacent body member 63,64 and is formed with axially extending slots which receive radial projections 79,80 on the body member, thereby locking those parts together for rotation. Each body member 63, 64 is formed on its periphery with gear teeth 81, 82 and both sets of teeth are engaged by a wide tooth gear wheel 83 which is rotatably supported on trunnion 84 in the housing 61 and is accessible from the other side of the brake back plate 62. Rotation of gear wheel 83 by any suitable means rotates the two body members and then the plunger members 71 and 72 of the two tappet assemblies. The abutment member 69 and 70 of the tappet assemblies being held against rotation by their engagement with the respective brake shoes, the screw threaded engagement between each plunger member and its co-operating abutment member results in simultaneous increase (or decrease) in the overall lengths of the two tappet assemblies, thus permitting compensation for wear of the brake linings.

Boots for excluding dirt are again provided between the abutment members 69 and 70 and the housing 61, only one of these boots being shown at 85.

Figure 5:
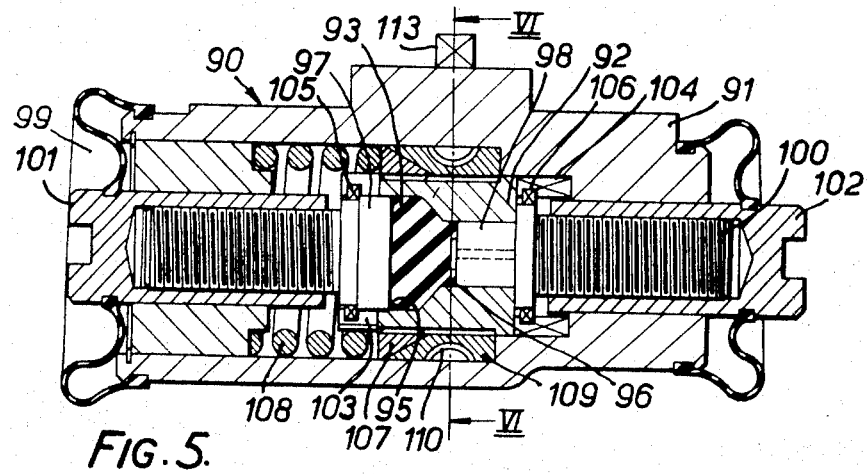
FIG. 5 is a longitudinal section, parallel to the axis of the brake drum through a fourthform of abutment assembly.
Figure 6:
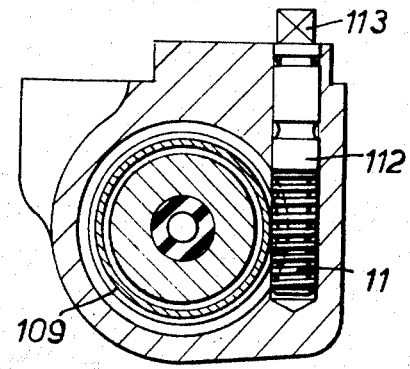
FIG. 6 is a cross section on the line VI — VI of FIG. 5.

The abutment assembly 90 shown in FIGS. 5 and 6 is constructed to produce a reduction in the force transmitted from one shoe to the other for one direction of drum rotation only, as in the constructions of FIGS. 1 and 2, but it embodies means for effecting automatically the adjustment in the overall lengths of the tappet assemblies which is necessary to compensate for wear. This construction comprises a housing 91 secured to the brake back plate (not shown in FIGS. 5 and 6) and formed with axially extending bores which accommodate a body member 92 and two oppositely extending adjustable tappet assemblies having many features in common with the corresponding parts of the construction shown in FIG. 2

Briefly, body member 92 has a bore comprising a larger end portion, a tapering portion and a smaller end portion, accommodating an elastically deformable member 93 of corresponding form provided at its ends with sealing rings 95 and 96. The larger and smaller end faces of member 93 are engaged respectively by pistons 97,98 of corresponding diameter, the pistons abutting plunger members 99 and 100 which are respectively in screw threaded engagement with abutment members 101 and 102 whose outer ends are shaped for engagement with the brake shoes. Gear teeth 103 and 104 projecting axially from the two ends of the body member mesh respectively with gear teeth 105 and 106 on the two plunger members 99, 100 so that rotation of the body member will result in simultaneous adjustment of the overall length of the two tappet assemblies constituted by members 97–99–101 and by members 98–100–102 respectively.

Body member 92 is formed externally with a quick-pitch screw thread which meshes with a similar thread on the internal surface of a clutch ring 107 which is externally of frusto-conical form. A compression spring 108 urges ring 107 into engagement with the correspondingly coned surface of a normally stationary ring 109. When a load is applied to the tappet assembly (on the left in FIG. 5) which bears on the larger diameter end of the compressible member 93, a reduced force is transmitted to the other tappet assembly in the manner already described. Body member 92 being held against movement to the right by the engagement of its teeth 104 with a shoulder in the housing, the clutch parts are not effected by this braking operation. However, when during reverse braking a load is applied to the tappet assembly 102–100–98, the body member moves axially and the whole force is transmitted to the tappet assembly 97–99–100 the manner already described. This axial movement of the body member applies axial and rotational forces to the ring 107 opposing the action of spring 108 and causing partial rotation of ring 107. When body member returns to the right (either under the action of a sufficiently powerful return spring, or upon the next application of a load to the left hand tappet assembly), ring 107 re-engages the stationary ring 109 and is held against rotation and the body member 92 is given a partial rotation which is transmitted through gear teeth 103–105 and 104–106 to the plunger members 99 and 100 of the two tappet assemblies thereby simultaneously increasing the overall lengths of these assemblies.

The normally stationary ring 109 is formed on its external periphery with worm wheel teeth 110 which are in mesh with a worm 111 (See FIG. 6) formed on a shaft 112 which is rotatably supported in the housing 91 and has a projecting squared end 113. By applying a suitable tool to this squared end of the worm shaft, the clutch rings and body member can be rotated to effect manual adjustment of the tappet assemblies, or to clear any jamming of the automatic adjusting mechanism.

Figure 7:
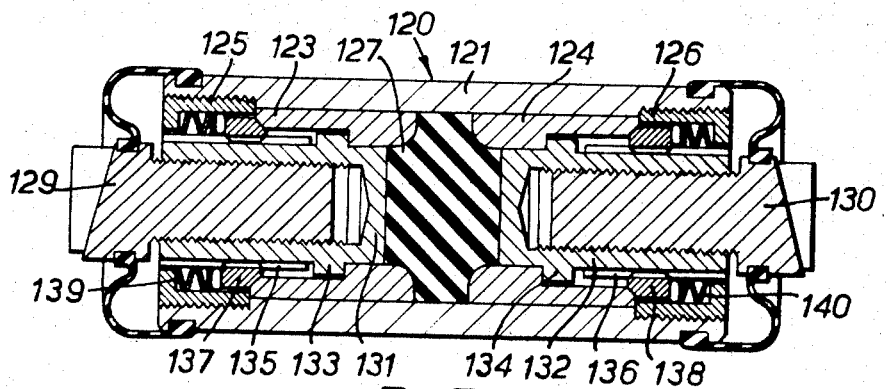
FIG. 7 is a longitudinal section perpendicular to the axis of the brake drum through a fifth form of abutment assembly in accordance with the invention.

The abutment assembly 120 shown in FIG. 7, like that of FIGS. 4 and 5, is so constructed as to produce a reduction in the force transmitted from one shoe to the other for both directions of drum rotation and also embodies means for effecting automatically adjustment in the overall length of the tappet assemblies these adjusting means being in this case responsive to actuation of the brakes in both directions of rotation.

In this construction a housing 121 secured to the brake back plate (not shown in the FIGURE) has an axially extending bore accommodating two similar and oppositely disposed body members 123,124 which are slidable axially of the housing but are each prevented from moving outwardly (that is away from the other housing member) by end members 125,126 fast to the housing. The housing and the body members together provide a chamber having a central portion of relatively large cross section and two end portions of equal but smaller cross section, the decrease of cross section between the central and end portions being progressive and gradual. This chamber contains an elastically deformable member 127 which fits closely into the chamber and is effectively two of the deformable members used in the previously described constructions, disposed in back to back relationship.

The housing further accommodates two similar and oppositely arranged tappet assemblies, each comprising an abutment member 129,130, whose outer end is shaped for engagement with one of the brake shoes and a plunger member 131 or 132 in screw threaded engagement with the abutment members. The inner end of each plunger member makes a piston-like fit within the corresponding body member and its end face engages one of the end faces of the elastically deformable member 127. A flange 133 or 134 on each plunger member engages a shoulder on the corresponding body member, so that while the plunger can move outwardly relative to the body member, inward movement of the plunger carries the body member with it.

It will be appreciated that when a load is applied to either of the abutment members by the corresponding brake shoe (say to member 129) the load is transmitted to the plunger member 131 of that tappet assembly which, together with the corresponding body member 123 moves inwardly (to the right in the drawing) and compresses the deformable member 127. A reduced load is transmitted to the plunger member 134 of the other tappet assembly which moves outwardly (to the right) and transmits the reduced load to the other brake shoe. Similarly, the application of a load to abutment member 130 will result in the transmission of a reduced load to the left hand tappet assembly and the brake shoe with which it is engaged.

The plunger member of each tappet assembly is formed externally with a quick pitch thread 135 or 136 which engages a similar internal thread on a clutch ring 137 or 138 which is urged by a spring 139 or 140 into engagement with the corresponding body member 123, 124. The movement to the right of the other plunger member 132 applies to the clutch ring 138 an axial force sufficient to overcome that of the spring 140 so that the engagement between members 138 and 124 is released and the plunger is permitted to move outwardly without rotation. On the return movement, clutch members 138 and 124 re-engage, producing a rotational movement of plunger 132 which adjusts the length of the right hand tappet assembly, while clutch members 137 and 123 are forced apart, allowing the plunger 131 to return without reversing the adjustment made during the forward stroke. Similar adjustment occurs in response to braking action in the opposite direction of rotation.

It will be understood that while a number of different abutment assemblies have been described, many other variations of construction are possible. In particular it will be understood that features embodied in two or more of the different constructions described and illustrated may be used in combination with one another. By way of specific example, tappet assemblies comprising a bolt-like abutment member engaged within a sleeve-like plunger member such as are shown in FIGS. 2 and 7, may be substituted in the constructions of FIGS. 1, 3, 5 and 6. Again sealing rings of the kind shown at 43, 44 in FIG. 2 and at 95, 96 in FIG. 5 may be provided also in the constructions of FIGS. 1, 3 and 4 and 7. In all constructions the substantially rigid sealing rings described may be replaced by other sealing means: for example flat discs may be provided between the end faces of the elastically compressible member and the end faces of the co-operating pistons, which discs will be axially compressed and thus radially extended when subjected to axial pressure.

What I claim is:

1. In a vehicle drum brake including a back plate, actuator means mounted on the back plate, and a pair of brake shoes each having one of its ends connected to the actuator means, an abutment assembly connected between the other ends of the brake shoes, said assembly comprising; means mounted on the back plate defining at least one chamber open at both ends, said chamber having two end portions each of uniform cross-section, one larger than the other, and an intermediate portion interconnecting the two end portions and progressively decreasing in cross-section from the larger to the smaller, two piston members respectively engaged in the two end portions of the chamber, elastomeric material filling the chamber between the piston members and occupying at least said intermediate portion thereof and a part of the larger end portion thereof, and respective tappets coupling said pistons to said other ends of the two brake shoes.

2. An assembly according to claim 1, wherein the elastically deformable member has two end portions, each of uniform cross section but one larger than the other, and an intermediate portion of tapering cross section, the deformable member being confined within a correspondingly shaped cavity in a body member which can move only in a direction opposite to the direction of taper, between the pistons, whose cross sections are respectively equal to the two ends of the deformable member.

3. An assembly according to claim 2, wherein two such elastically deformable members and their respective body members are arranged with their larger ends together, and engaged by a common piston, the smaller ends of the deformable members being engaged by pistons forming parts of the respective tappets.

4. An assembly according to claim 2, wherein two such deformable members have their larger ends united to form a single member confined between two body members, each movable only towards the other, the ends of the deformable member being engaged by pistons forming parts of the respective tappets.

5. In a vehicle drum brake including a back plate, actuator means mounted on the back plate, and a pair of brake shoes each having one of its ends connected to the actuator means, an abutment assembly connected between the other ends of the brake shoes, said assembly comprising; means mounted on the back plate defining at least one chamber open at both ends, said chamber having two end portions each of uniform cross-section, one larger than the other, two piston members respectively engaged in the two end portions of the chamber, elastomeric material filling the chamber between the piston members and occupying at least a part of the larger end portion thereof, sealing means interposed between each of said pistons and said elastomeric material and covering the clearance gap between the piston and the wall of the chamber to prevent access of said elastomeric material to said gap, and means coupling said pistons to said other ends of the two brake shoes.

6. An assembly according to claim 1 wherein said tappets are adjustable in length to compensate for brake wear.

7. An assembly according to claim 6, wherein means are provided for automatically adjusting the lengths of the tappets in response to operation of the brake.

* * * * *